United States Patent [19]

Hall et al.

[11] Patent Number: 5,081,573
[45] Date of Patent: Jan. 14, 1992

[54] PARALLEL PROCESSING SYSTEM

[75] Inventors: William E. Hall, Beaverton; Dale A. Stigers, Hillsboro; Leslie F. Decker, Portland, all of Oreg.

[73] Assignee: Floating Point Systems, Inc., Beaverton, Oreg.

[21] Appl. No.: 469,818

[22] Filed: Jan. 23, 1990

Related U.S. Application Data

[63] Continuation of Ser. No. 77,535, Dec. 3, 1984, abandoned.

[51] Int. Cl.$^5$ ...................... G06F 15/20; G06F 13/00
[52] U.S. Cl. .................................. 395/800; 364/228.1; 364/228.3; 364/228.6; 364/229; 364/229.2; 364/230.4; 364/231.9; 364/239.4; 364/239; 364/240; 364/240.1; 364/244.2; 364/244; 364/254
[58] Field of Search ... 364/200 MS File, 900 MS File, 364/716, 730, 748

[56] References Cited

U.S. PATENT DOCUMENTS

| | | | |
|---|---|---|---|
| 3,573,853 | 4/1971 | Watson et al. | 364/200 |
| 3,573,854 | 4/1971 | Watson et al. | 364/200 |
| 3,787,673 | 1/1974 | Watson et al. | 364/200 |
| 4,085,450 | 4/1978 | Tulpule | 364/900 |
| 4,101,960 | 7/1978 | Stokes et al. | 364/200 |
| 4,219,873 | 8/1980 | Kober et al. | 364/200 |
| 4,302,818 | 11/1981 | Niemann | 364/736 |
| 4,435,758 | 3/1984 | Lorie et al. | 364/200 |
| 4,481,580 | 11/1984 | Martin et al. | 364/200 |
| 4,507,726 | 3/1985 | Grinberg et al. | 364/200 |
| 4,507,748 | 3/1985 | Cotton | 364/749 |
| 4,514,807 | 4/1985 | Nogi | 364/200 |
| 4,525,796 | 6/1985 | Omoda | 364/730 |
| 4,541,048 | 10/1985 | Propster | 364/200 |
| 4,553,203 | 11/1985 | Rau et al. | 364/200 |
| 4,649,476 | 3/1987 | Sibigtroth | 364/200 |
| 4,685,067 | 8/1987 | Yoshida | 364/736 |
| 4,712,175 | 12/1987 | Torii et al. | 364/200 |

FOREIGN PATENT DOCUMENTS 21138784 8/1983 United Kingdom ............... 364/730

OTHER PUBLICATIONS

"Memory-Mapped VLSI Improves Scientific Computer Performance", Computer, vol. 17, No. 5 (May 1984), pp. (99).
Joseph Aseo, "Matrix Array processor Breaks Through Supercomputer Barrier", Computer Design, vol. 23, No. 9 (Aug. 1984), pp. (38,40).
Karen Berney, "IBM Eyes Niche in Burgeoning Supercomputer Market", Electronics, vol. 57, No. 14 (Jul. 12, 1984), pp. (45,46).
"Parallel Architecture Permits Computer to Do 34 1 MIllion Floating-Point Operationsis", Electronics, vol. 57, No. 10 (May 17, 1984), pp. (162).
Alan E. Charlesworth et al., "Introducing Replicated YLSI to Supercomputing: the FPS-164/MAX Scientific Computer", Computer (Mar. 1986).
Batcher, K. E. "Design of a Massively Parallel Processor", IEEE Transactions on Computers, vol. C-29, No. 9 (Sep. 1980), pp. 836-840.
Hillis, W. D., "Chapter 4 The Prototype", In: Hillis, W. D., The Connection Machine (Massachusetts, 1985), pp. 71-90.
Hillis, W. D. The Connection Machine, Massachusetts, Sep., 1981, pp. 1-21, 23-29.

*Primary Examiner*—Thomas C. Lee
*Assistant Examiner*—Robert B. Harrell
*Attorney, Agent, or Firm*—Dellett, Smith-Hill and Bedell

[57] ABSTRACT

A parallel processing system utilizes a plurality of simultaneously operable arithmetic units to provide matrix-vector products, with each of the arithmetic units implementing the matrix-vector product calculations for plural rows of a matrix stored as vectors in an arithmetic unit. A column of a second matrix is broadcast to the respective arithmetic units whereby the products may be developed in all the arithmetic units simultaneously. The broadcasting of the matrix elements is accomplished via a memory bus which may be employed for selectively or simultaneously accessing registers in the various arithmetic units whereby vector information may be written into memory addresses and calculation results retrieved therefrom.

14 Claims, 7 Drawing Sheets

PARALLEL PROCESSING SYSTEM

This is a continuation of application Ser. No. 06/677,535, filed Dec. 3, 1984, and now abandoned.

BACKGROUND OF THE INVENTION

The present invention relates to high speed parallel arithmetic circuitry and particularly to such circuitry for providing convenient accessibility to and from parallel arithmetic units.

Many complex computing problems involve highly replicated arithmetic operations. Scientific computing typically includes large continuum models that invariably generate a large, sparse matrix to be solved and this matrix-solving step is the bottleneck of the run for general-purpose computers. In order to solve complex problems in a reasonable time, the components of a monolithic supercomputer must be chosen for maximum speed, regardless of expense. However, computing circuitry relying upon replicated design can independently optimize performance and cost efficiency. Therefore, replicated, very large scale integrated circuits can provide the parallel solution of parts of many kinds of computationally intensive problems in a reasonable time.

An example of a fundamental operation that dominates scientific computing, the so called matrix-vector product (MVP), is the basis of both matrix multiplication and linear equation solving. If scientific matrix problems required only a single matrix-vector product at a time, then the only way to increase its speed would be to use faster arithmetic and memory circuits to implement a monolithic MVP unit. However, problems involving matrix-vector products require multiple MVPs to be evaluated. Thus, an alternative tactic for gaining speed is to devise parallel versions of the matrix-vector product.

The implementation of parallel arithmetic units for performing a computation such as the matrix-vector product is typically somewhat inflexible and special purpose oriented. Thus, individual units are not readily accessible from the standpoint of control and from the standpoint of data access to and from parallel units. Furthermore, the theoretically optimum speed may not be easily realized. An advantageous system would provide convenient and accessible communication with parallel computational units and at the same time take advantage of the speed possibilities of the units.

SUMMARY OF THE INVENTION

In accordance with the present invention in a particular embodiment thereof, a parallel processing system includes a central processor unit, a memory system, a memory bus coupling the central processor unit and the memory system. A plurality of memory mapped arithmetic units are also coupled with the memory bus whereby these arithmetic units are addressable for writing data into selectable units and for reading data from selectable units. A portion of the memory address space is divided into segments, one for each of the arithmetic units, and is used for reading and writing data and control information to the respective units. A special segment in the address space writes to all of the arithmetic units so that common data is broadcast thereto.

The system typically performs a matrix-vector product (MVP) defined by the expression $y = A*x$, where $y$ is a vector with m elements, $A$ is a matrix with m rows and n columns, and $x$ is a vector with n elements. The vector x is stored in the individual arithmetic units and elements of A are provided on the memory bus to the arithmetic units. Typically, dot products are performed wherein a single element of y is accumulated in an arithmetic unit as the sum of the element by element products of a row of A against the locally stored vector x. The dot products with the same vector x can be completed with successive rows of A and a vector output is provided. The different arithmetic units locally store different vectors x with each unit calculating the elements of a different output vector. The process is repeated for each row of A for a matrix multiply.

The various registers in the arithmetic units are readily accessed as memory and can be input or output as desired. Each arithmetic unit, instead of storing only one vector x, can store a plurality of such vectors so that optimum time use is made of the elements of A received on the bus. In addition to the dot product calculation, other types of calculation are possible including VSMA (vector scalar multiply-add) and VMSA (vector multiply scalar add). The operation of the arithmetic units is controlled according to control information as addressed to memory corresponding to the arithmetic units.

It is an object of the present invention to provide an improved parallel processing system, the elements of which are readily accessible and controllable.

It is another object of the present invention to provide an improved parallel processing system for producing a matrix-vector product.

It is another object of the present invention to provide an improved parallel processing system which is rapid in operation and which makes optimum use of storage and communication facilities.

It is a further object of the present invention to provide an improved system for performing calculations involving sparse matrices.

The subject matter of the present invention is particularly pointed out and distinctly claimed in the concluding portion of this specification. However, both the organization and method of operation thereof, together with further advantages and objects, may best be understood by reference to the following description taken in connection with accompanying drawings wherein like reference characters refer to like elements.

DESCRIPTION OF THE PREFERRED EMBODIMENT

Figure 1:
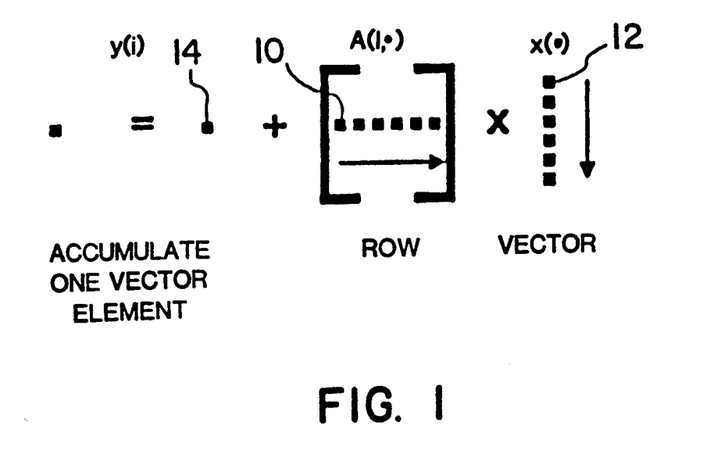
FIG. 1 is an illustration of a first type of calculation suitable for parallel processing.

A calculation suitable for illustrating the operation of the processor according to the present invention comprises the matrix-vector product or MVP since it forms a basis of both matrix multiplication and linear equation solving. The MVP is a sum-of-products operation: $y = A*x$, where y is a vector with m elements, A is a matrix with m rows and n columns, and x is a vector with n elements. In one computational form, the dot product form, the sum of element by element products of a row of A against the vector x is accumulated into a single element of y. Referring to FIG. 1, as a first step the first element, 10, of a row of A is multiplied with the top element, 12, of the vector x. Then the second element of a row of A is multiplied with the next to the top element of vector x and added to the product of the first step at 14. Next the third element of a row of A is multiplied with the third element of vector x and added to the previous accumulation 14, etc. The complete MVP is accomplished by m dot products involving the same vector x with succesive rows of A.

Figure 2:
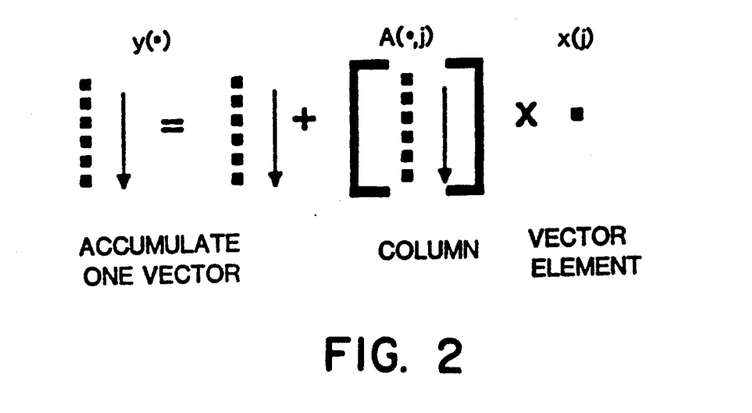
FIG. 2 is an illustration of a second type of calculation suitable for parallel processing.

Another form of computation for providing the MVP is illustrated in FIG. 2. This form accumulates into all the elements of y the products of a single element of x with respective elements of a column of A. This form is called VSMA, for vector scalar multiply-add. A complete MVP is accomplished by n such VSMA operations involving successive elements of x against successive columns of A. It is understood the terms "row" and "column" in the above discussion are somewhat interchangeable. Thus, in the dot product form, the sum may be accumulated of element by element products of a column of A against a row vector x.

For reference purposes, the dot product of two vectors A and B may be defined as follows:
Vector A: a1, a2, a3, ... an.
Vector B: b1, b2, b3, ... bn.
A.B: a1*b1 + a2*b2 + a3*b3 + ... + an*bn.
The VSMA can be illustrated in the following manner:
Vector A: a1, a2, a3, ... an.
Vector B: b1, b2, b3, ... bn.
Scalar C: c.
A + c*B: a1 + c*b1, a2 + c*b2, a3 + c*b3, ... an + c*bn.
A further form of the MVP, known as VMSA, or vector multiply scalar add is illustrated as follows:
Vector A: a1, a2, a3, ... an.
Vector B: b1, b2, b3, ... bn.
Scalar C: c.
c + A*B: c + a1*b1, c + a2*b2, c + a3*b3, ... c + an*bn.

Figure 3:
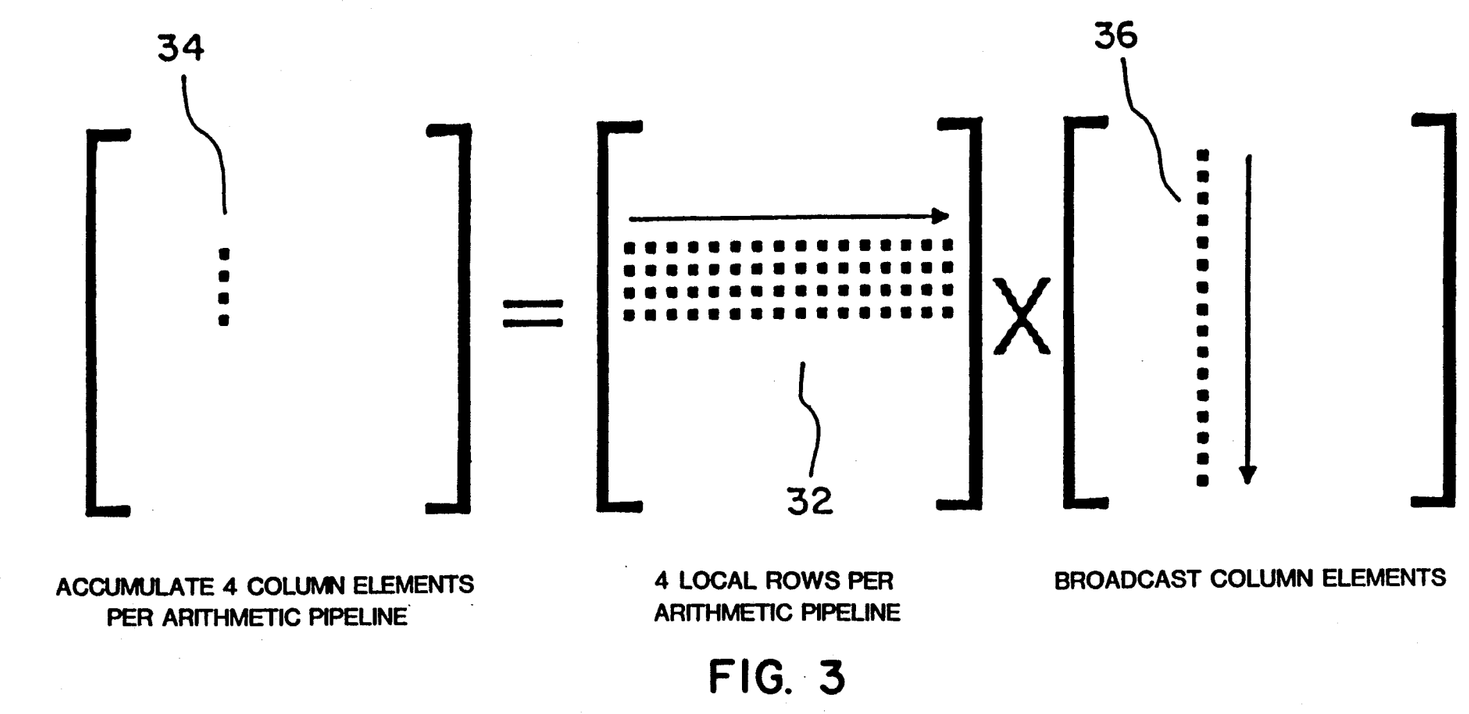
FIG. 3 illustrates a multiple calculation form of the type carried out by the present invention.
Figure 4:
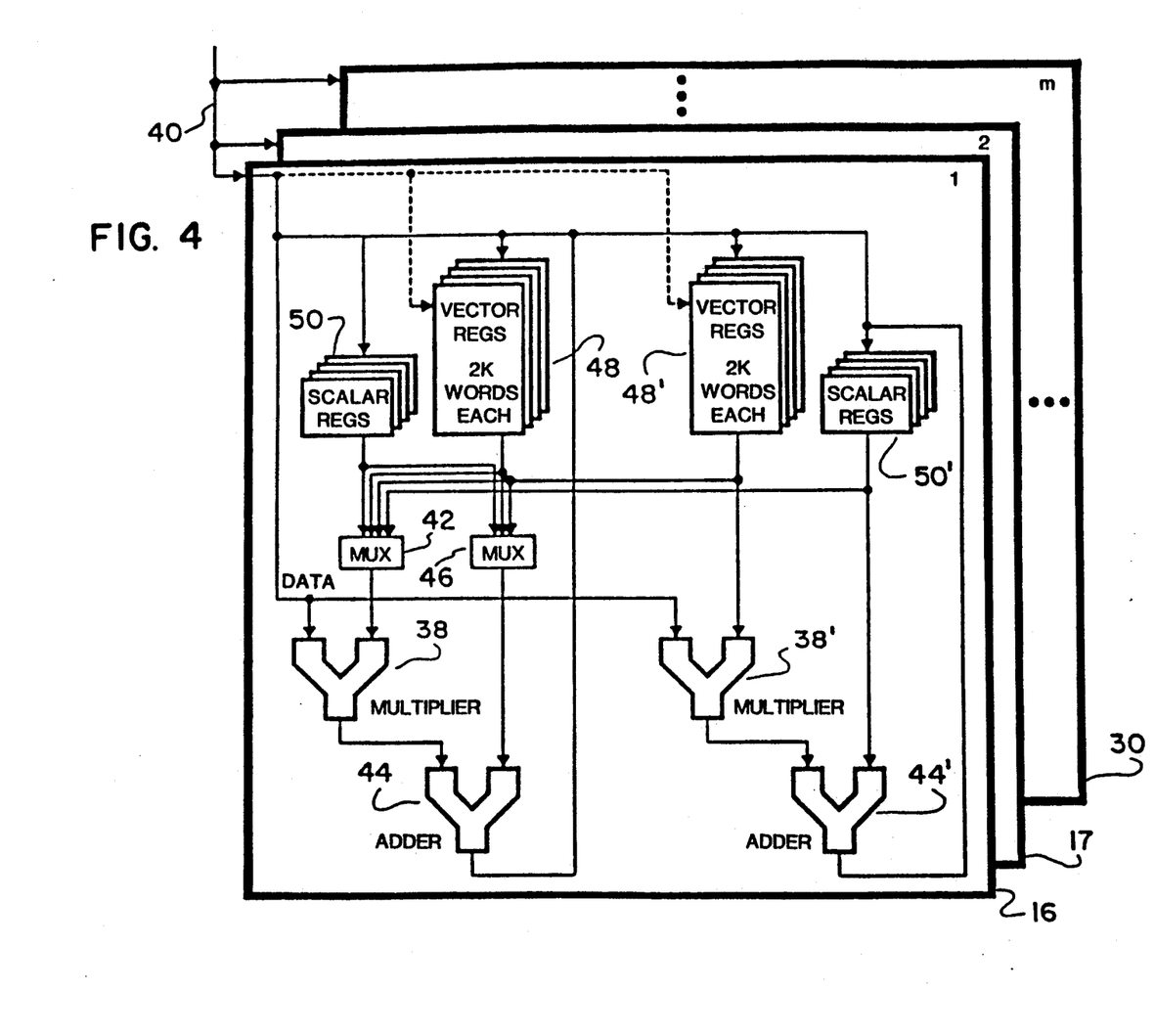
FIG. 4 is a block diagram illustrating arithmetic units as employed according to the present invention.

Individual MVPs are calculated in parallel according to the present invention employing plural MVP units or arithmetic units as illustrated in FIG. 4. Each of these arithmetic units 16, 17 ... 30 is adapted to perform an MVP calculation of the dot product type, or alternatively one of the other MVP forms as discussed above. The particular circuit locally stores four vectors illustrated as rows 32 in FIG. 3 and forms dot products 34 with the column 36 forming part of a matrix M. This provides part of a matrix multiplication illustrated in FIG. 3.

Referring further to FIG. 4, each arithmetic unit such as unit 16 is adapted to perform a multiply-add calculation and hence includes a first multiplier 38 receiving an input from bus means 40 and a second input from multiplexer 42. The product output from multiplier 38 is coupled as an input to adder 44 further receiving a second input from multiplexer 46. The arithmetic unit also includes a first set of four vector registers 48 and a first set of scalar registers 50 which selectively receive data input from bus means 40. Either the scalar registers 50 or the vector registers 48 may supply input to multiplier 38 or adder 44 through the aforementioned multiplexers 42 and 46. The output of adder 44 is coupled back as input to the registers 48 and 50.

The circuit for arithmetic unit 16 as thus far described is substantially duplicated as indicated by units identified by primed reference numerals on the right hand side of the drawing, and the right hand portion differs principally in that the output of vector registers 48' provides the only second input of multiplier 38' as well as being connected to inputs of both multiplexers 42 and 46. Furthermore, the output of scalar registers 50' provides the only second input for adder 44' while also connecting to multiplexer 42. The two substantially duplicate circuit halves of the arithmetic unit can each perform an MVP calculation of the dot product type wherein the four vectors, e.g. as illustrated at 32 in FIG. 3, are respectively stored in the registers 48 and another set of four is stored in registers 48'. Then the elements of column 36 in FIG. 3 are provided element by element on bus means 40 as input to the respective multipliers. A given input element of column 36 is retained for four cycles while multiplications are successively performed against the four rows stored in the vector registers. The multiplier, e.g. multiplier 38, and the adder, e.g. adder 44, are "pipelined" and take a number of cycles to provide an output after the respective inputs are supplied thereto. The multiplications and additions with respect to the four vectors stored in the vector registers are performed sequentially, and the sum of the product with the previous products as supplied by the adder is re-entered into the respective scalar registers. Thus, the previously accumulated sums from scalar registers 50 are added, via multiplexer 46, to the new product from multiplier 38, and the sums performed by adder 44 are re-entered into registers 50. The utilization of the vector and scalar registers in each half of the arithmetic unit enables four multiply-adds to take place in each half before further input data is required from bus means 40 and consequently the operation is not delayed by waiting for additional data. In the case of the dot product form of calculation, each half of the arithmetic unit operates substantially independently and so eight vectors are stored locally in registers 48 and 48', while providing the products for eight rows, four of which are indicated at 32 in FIG. 3.

The arithmetic unit 16 is further duplicated at 17 ... 30 in FIG. 4 providing a total of fifteen arithmetic units or thirty half units all intercoupled to the same synchronous bus means 40 for operating substantially simultaneously. Thus, the dot product calculation is not just performed for eight vectors as illustrated for the case of arithmetic unit 16, but for eight times the number of arithmetic units. The same column elements of a matrix M (at 36 in FIG. 3) are broadcast to all the arithmetic units employing synchronous memory bus means whereby an MVP calculation of substantial size can be performed.

Figure 5:
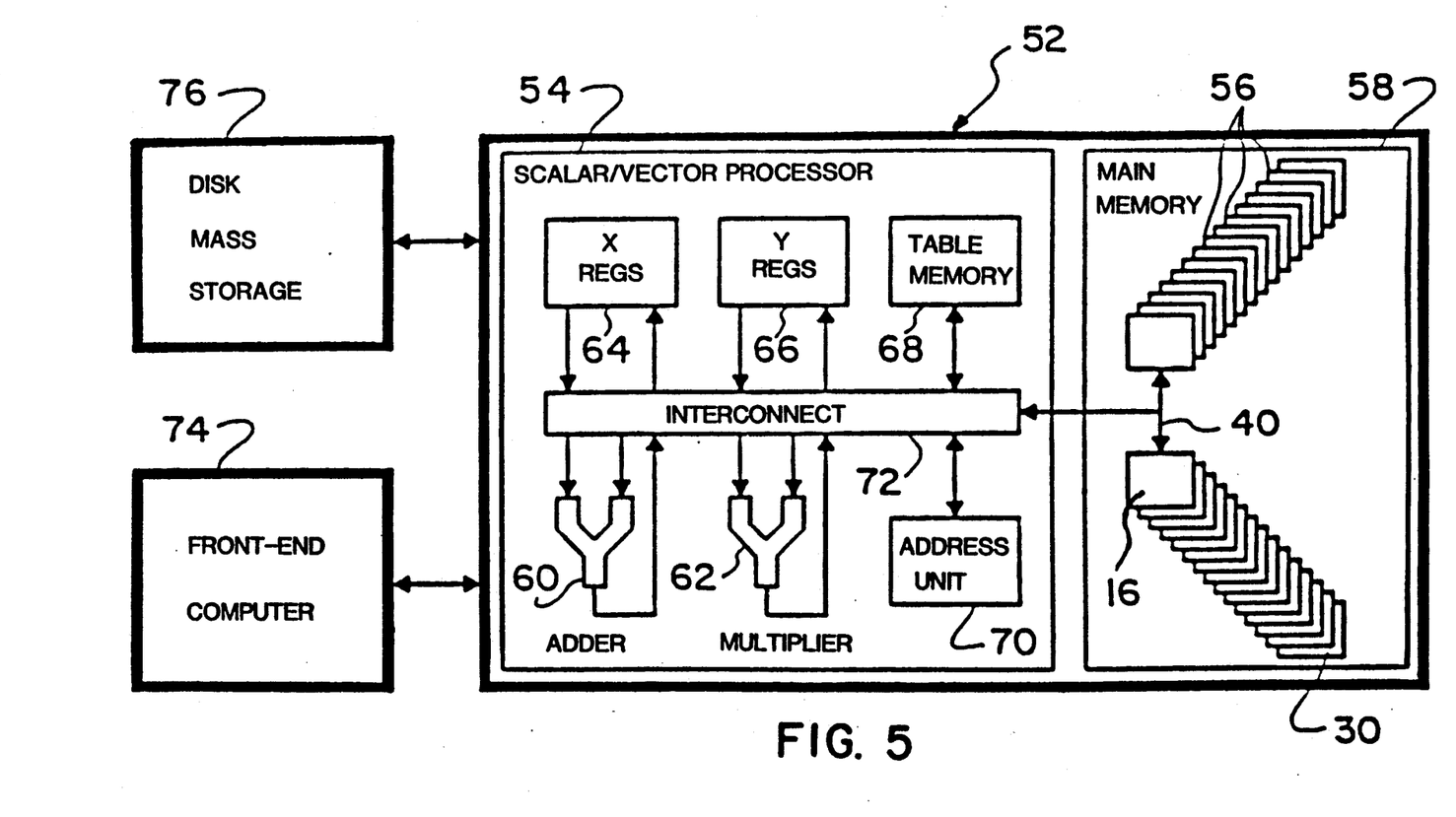
FIG. 5 is an overall block diagram illustrating a parallel processing system according to the present invention.

The overall arrangement of the parallel processor according to the present invention is illustrated in FIG. 5. FIG. 5 depicts a complete system according to the present invention comprising a central processing unit 54 provided with a main memory, in this case including a plurality of memory circuit boards 56. The central processing unit 54 is suitably an FPS-164 array processor manufactured by Floating Point Systems, Beaverton, Oreg., and includes an adder 60, multiplier 62, X registers 64, Y registers 66, table memory 68, and address unit 70 coupled together via interconnect bus circuitry 72. The processor 54 in the form of an array processor is typically connected to a front-end computer or host computer 74, and to disk mass storage 76. In a typical instance, the host computer 74 comprises a VAX-11/780 manufactured by the Digital Equipment Company. The front-end computer handles interactive time-sharing, while the processor 54 concentrates on arithmetic-intensice calculations. In the particular system organization according to the present invention, the processor 54 is used principally for scalar calculations and for controlling the operation of plural, parallel arithmetic units 16-30.

The arithmetic units 16-30 physically comprise boards each having the circuit configuration as outlined for unit 16 in FIG. 4, and are intercoupled with synchronous memory bus means 40 used in common with processor 54 and main memory boards 56. Parallel, memory-mapped processing is provided by the arithmetic units 16-30 which share the common memory address and memory data buses with main memory 56. Although fifteen arithmetic units are illustrated, it is understood a greater or lesser number can be employed as desired. The particular type of central processing unit 54 and front-end computer 74 are given by way of example and it is understood the present invention is not limited thereto.

Thus, computational units are provided which are readily accessible and wherein a "memory" write can bring about computation in one or all of the arithmetic units, with the result being subsequently retrieved by reading an address of arithmetic units in memory. As hereinbefore indicated, a common input operand may be broadcast to a plurality of the arithmetic units 16-30, with each one performing calculations with respect to data theretofore stored therein, for example representing plural vectors or rows of a matrix.

Figure 6:
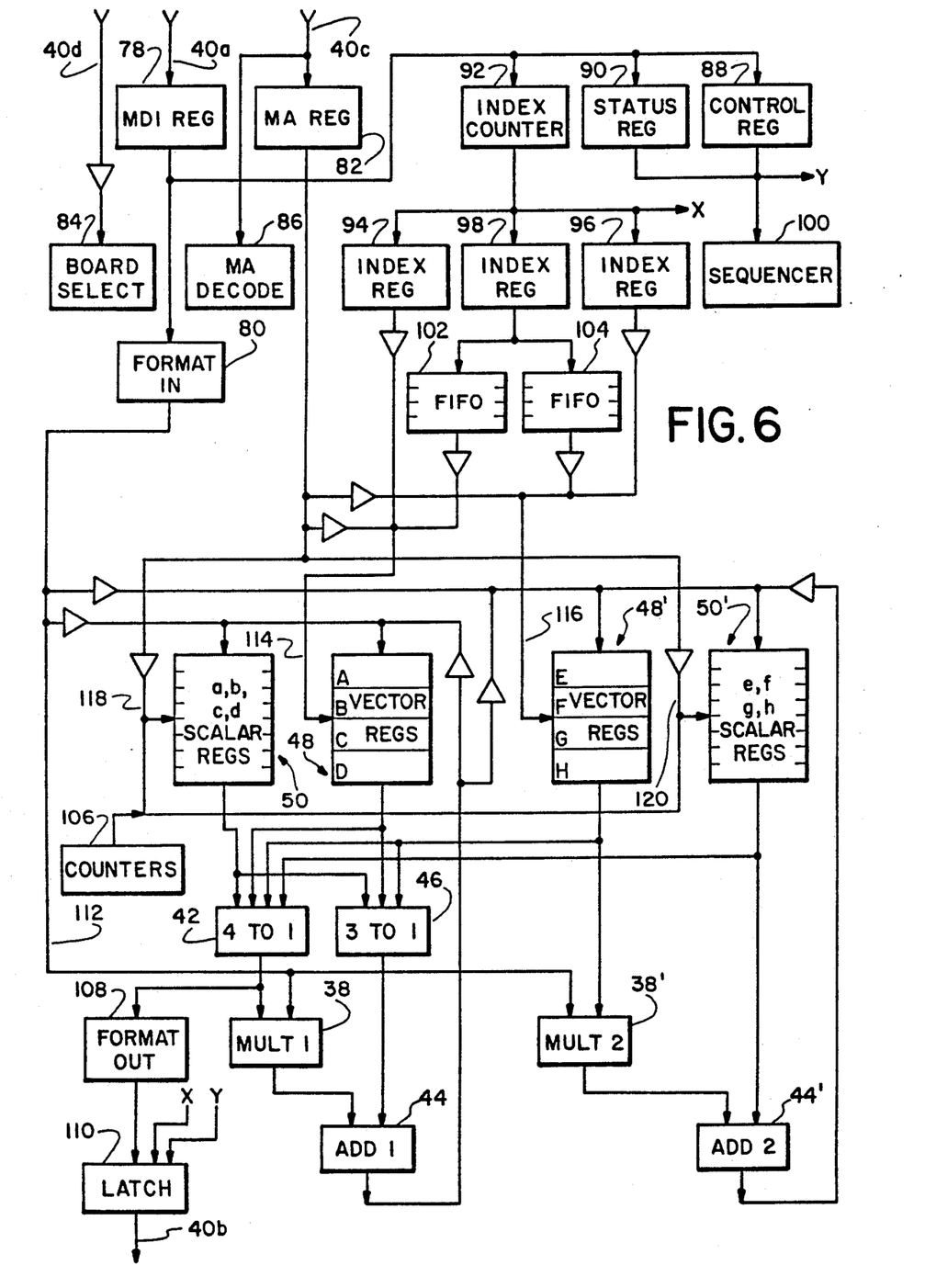
FIG. 6 is a more detailed block diagram of an arithmetic unit according to the present invention.

Referring to FIG. 6, an arithmetic unit of the type hereinbefore described with reference to FIG. 4 is illustrated in greater detail. Memory write data from memory data bus 40a is received by main data input register 78 forming the only data input path to the arithmetic unit of FIG. 6. All data written to the FIG. 6 arithmetic unit is first loaded into this register which is suitably 64 bits wide. In a particular example, the data is in a normalized floating point format used by processor 54 in FIG. 5. Data may be written to scalar registers 50, 50', to vector registers 48, 48', or to the data pipe indicated at 112. Data may also be written to index counter 92, control register 88, or status register 90, in which case the data is in integer form, right justified within the 64-bit word. The formatter 80 is utilized for floating point conversions from the format of processor 54 to the format of the devices employed in multiplier units 38, 38' and adder units 44, 44', which is an IEEE 64-bit floating point format. Of course, if the processor 54 utilizes the last mentioned format, then circuit 80 is unnecessary.

Data pipe 112 (also called advance pipe), suitably comprising a register used as input to multiplier 38 and/or multiplier 38', is utilized to provide input data to the respective multipliers for four clock cycles such that an input operand (for example an element of vector column 36 in FIG. 3) may be successively multiplied with elements of matrix rows 32. This input comprises one of the inputs to each of the multipliers 38, 38', while the remaining input of each of the multipliers is obtained from one of the registers in the arithmetic units as hereinafter more fully described. The multipliers 38 and 38' are each capable of forming a product of two 64-bit floating point numbers. The multipliers are pipelined and require a plurality of clock cycles for producing an output product. In a particular example, these multipliers comprised WTL1065 units manufactured by Weitek.

Memory address bus portion 40c is coupled to memory address register 82 and to memory address decoder 86. The address in register 82 is utilized for addressing vector registers 48, 48' and scalar registers 50, 50' by way of bus connections 114, 116, 118 and 120 respectively. Bits of the address are decoded by decoder 86 to determine which of the aforementioned registers is being accessed for a read/write operation. It is noted the various registers of the arithmetic unit are independently accessible in the same manner as other portions of memory would be. Other address bits from memory address portion 40d are received by board select circuit 84 where these bits are compared to the logical address of the particular arithmetic unit, and if a match is detected, then all the internal registers of this particular arithmetic unit are accessible for read/write operations. It should be observed that a match is available for either addressing this arithmetic unit by itself, or as a part of a group of arithmetic units for the purpose of broadcasting a common operand to more than one unit. Registers 48, 48' and 50, 50' of an arithmetic unit are not accessible when the arithmetic unit is busy completing a vector form operation.

Index counter 92 is a twelve bit counter used for addressing the locations of vector registers 48 and 48'. The counter's function is either to hold a value being written to an index register 94, 96, or 98, or to increment a previous value that has been written or incremented. Data for the counter 92 is received from register 78. The index counter value is "locked down" for internal use for four cycles by any write to the data pipe 112. The index registers 94, 96 and 98 are all twelve bits wide and are locked down "copies" of the index counter value whenever any write of the data pipe occurs. Writes to the index counter do not affect the value in the index registers until a write to the data pipe takes place in which case the index counter number is copied into the desired index register or registers.

Index register 98 provides an output for first-in first-out registers (FIFOs) 102 and 104 which function as read-write registers for the temporary storage of addresses for vector registers 48, 48'. Each FIFO is suitably four locations deep.

Each vector storage register has its own index register and FIFO associated therewith for addressing the particular vector storage register. Thus, index register 94 and FIFO 102 may provide an address to vector storage register 48 by way of bus 114, while index register 96 and FIFO 104 may provide addressing to vector register 48' via bus 116. The index register 98 provides the input to FIFOs 102 and 104.

During the operation of the arithmetic unit, the processor 54 sets the counter 92 with a starting index for addressing the vector registers 48 and 48'. During an auto increment mode of operation, the index counter 92 causes registers 94 and 96 to provide successive addresses for the vector registers 48 and 48'. The auto incrementation is appropriate when operating on either full, banded, or profile matrices. However, the addresses for the vector registers may be supplied alternatively from memory address register 82 to set the index before each multiply-add of the arithmetic unit for operating on sparse matrices. The apparatus is capable of sparse matrix operation at full speed without requiring incremental operation. In the case of sparse matrices, the indices are read from a table of pointers in the processor.

The FIFOs are used to delay the index value for certain forms of computation in the arithmetic unit. The index value is held and read out for addressing the vector registers at the appropriate time, taking into consideration the pipelines presented by the multiply-add circuitry. One of the FIFOs is suitably employed for reading one of the vector registers, while the other FIFO is employed for providing an address for writing into a vector register at a later time.

The two separate vector storage registers are employed for storing two separate sets of four vectors each. Thus, vector register 48 is employed for storing A, B, C, D vectors (also indicated as 0, 1, 2, 3), and vector register 48' is employed for storing E, F, G, H vectors (also indicated as 4, 5, 6, 7). Each storage register is suitably 8K locations deep and is divided into four 2K regions, one region for each vector.

Data read from vector register 48 has three destinations: It can be supplied as an input operand to multiplier 38 (via multiplexer 42), or as an input to adder 44 (via multiplexer 46), or it may be provided to format circuit 108 (via multiplexer 42) and latch 110 for output onto the memory read data connection on memory out bus 40b. Data read from vector storage register 48' has four possible destinations: It can be supplied as an input operand to multiplier 38 (via multiplexer 42), to multiplier 38', to adder 44 (via multiplexer 46) or to format circuit 108 (via multiplexer 42) for output.

Data written into vector register 48 can come from two possible sources. It can be supplied by either the adder 44 output or as a data input from register 78 through formatter 80. Data written into vector register 48' has three possible sources. It can be provided from the same two sources as indicated for register 48 plus the output of adder 44'. The vector storage registers may be addressed either directly from the memory address register 82, or from an incremented address supplied by one of the index registers, or as an address supplied by one of the FIFO locations.

The scalar registers 50 and 50' are suitably two separate eight location stores for storing scalars designated $a_0, b_0, c_0, d_0, a_1, b_1, c_1, d_1,$ and $e_0, f_0, g_0, h_0, e_1, f_1, g_1, h_1$. Each location can be read and written in any one system clock cycle. Data read from register 50 has three possible destinations: It can be supplied as an input operand to multiplier 38 (via multiplexer 42), to adder 44 (via multiplexer 46), or to the format circuit 108 (via multiplexer 42) for output. Data read from scalar register 50' has two possible destinations: It can be supplied as an input operand to adder 44', or to format circuit 108 (via multiplexer 42) for output. Data written into scalar register 50 has two possible sources. It can come from the output of adder 44, or from register 78. Data written to scalar register 50 can be simultaneously written to the corresponding scalar register 50' locations. Data written to vector register 48 can be simultaneously written to vector register 48' locations. Data written into register 50' has the same two sources plus the output of adder 44'. Addressing of the scalar registers 50 and 50' can be accomplished as follows: The address can be input via address register 82 or supplied by counters 106 controlled by sequencer 100. Two counters are present, one being employed for reads and one for writes. The address can also be supplied by the sequencer during a collapse sequence (hereinafter more fully described).

Adders 44 and 44' are suitably WTL 1064 circuits manufactured by Weitek. Both adders are capable of performing addition and subtraction, with the subtrahend for subtraction comprising the multiplier output.

The arithmetic unit is further provided with a control register 88 and a status register 90 which can receive data from input register 78. Control bits specify the form of calculation to be performed by the arithmetic unit, e.g. a dot product form, a VMSA, or a VSMA. The control and sequencer accordingly provides the proper interconnections via the multiplexers to form one of the configurations as further illustrated in FIGS. 8, 9, and 10, and sequences the arithmetic unit through the steps as indicated for performing the particular calculation. Further bits supplied to the control register specify the adder operation to be either addition or subtraction. Bits also provide control of input of data to scalar registers 50, 50' and vector registers 48, 48', i.e. for determining whether a pair of these registers are written together or separately. As well as being controlled by the control register, the sequencer 100 is responsive to each write to the data pipe 112 for bringing about the desired multiply-add sequence. The status register 90 provides an indication for such factors as overflow, underflow, invalid operation, and denormalized operands. An indication is also given of the status of formatter conversion.

The formatter out circuit performs floating point data conversions from IEEE 64-bit floating point format, i.e. the format as employed by the devices employed in the multiplier units 38, 38' and adder units 44, 44', to the floating point format appropriate for processor 54. All data read from the vector registers 48, 48' or from the scalar registers 50, 50' go through the format out circuit before temporary storage in latch 110 coupled to memory read data bus connection 40b. Latch 110 can also receive the current contents of index counter 92, status register 90 and control register 88 on the connections marked X and Y.

Figure 7:
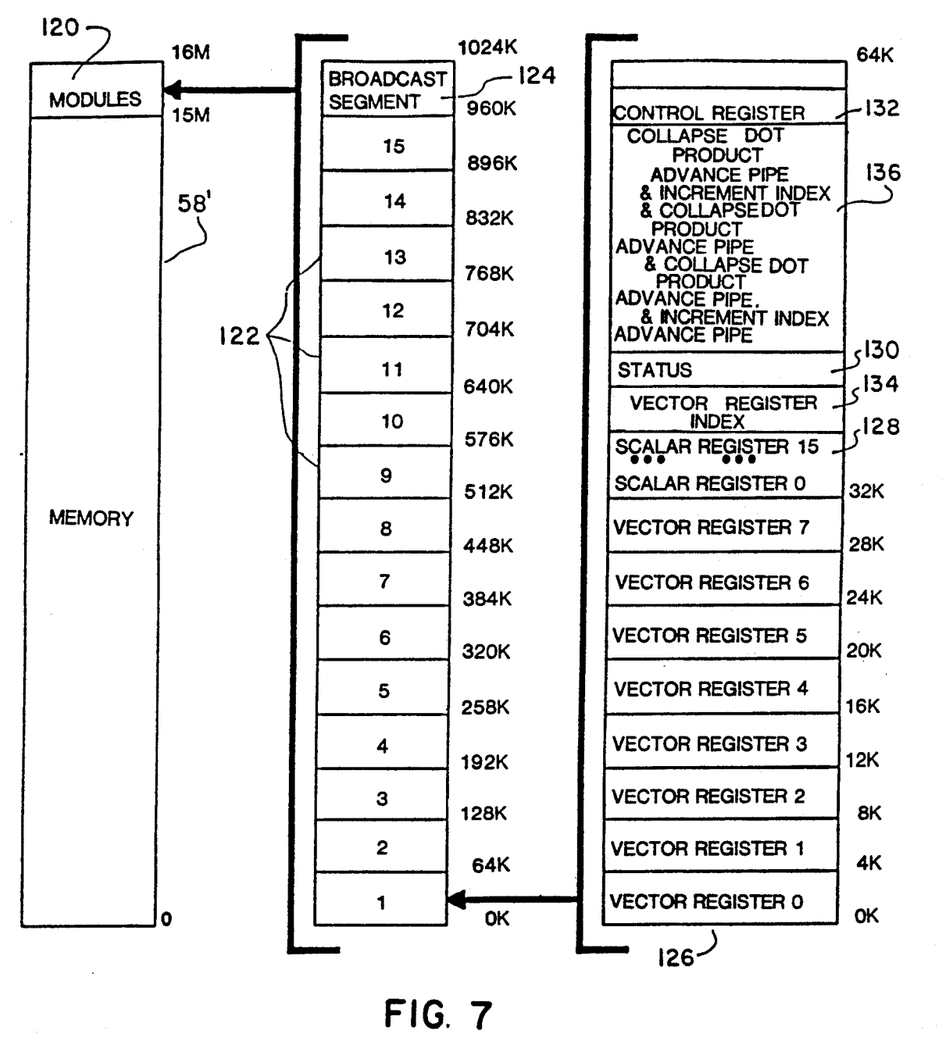
FIG. 7 is a memory map according to the system of the present invention.

FIG. 7 is a memory map of the system according to the present invention and consideration thereof will be useful in further explaining the operation of the system. The processor of FIG. 5 in the illustrated embodiment has a sixteen million word address space, indicated at 58' in FIG. 7, of which fifteen million words can be used to address the physical memory 56 in FIG. 5. The highest million words of the address space, 120, is divided into sixteen 64K word segments 122, one for each of fifteen arithmetic units 16-30 in FIG. 5. The last 64K address segment, 124, is a broadcast segment recognized by all the arithmetic units so that data or control can be directed simultaneously to the arithmetic units.

Inside a particular arithmetic unit, the lower 32K addresses are divided into eight 4K word blocks, one for each of the locations inside each vector register (48 and 48' in FIG. 6). These blocks are designated "Vector Register 0" to "Vector Register 7" in individual memory map 126. Each arithmetic unit also has addresses 128 for the scalar registers (50, 50' in FIG. 6), addresses 130 for status register 90 in FIG. 6, and addresses 132 for control register 88 in FIG. 6. The processor program writes data into, or reads results from, the arithmetic units in the same manner as with respect to the rest of the memory. The arithmetic units are, in effect, intelligent memory units since they both have computation and storage capability.

Writing to the control register address sets the vector form for the next computation. The vector register index address 134 sets the next location in the vector registers to be operated on, i.e. sets the index in index counter 92.

Writing data to the advance pipe (pipe 112 in FIG. 6) address actually causes a multiply-add to take place, i.e. a portion of the word is used as control, causing sequencer 100 to bring about a multiply-add procedure as hereinbelow more fully described.

The various addresses indicated at 136 in FIG. 7 pertain to the advance pipe 112 and to the control of the index used to address the vector registers for an ongoing calculation. After writing the vector register index to set the starting address for the respective vector registers, writing to "advance pipe and increment index address" sequences the arithmetic unit to do a multiply-add and advance to the next vector register element. Various combinations of advance pipe and increment index addresses are provided, together with collapse dot product which pertains to an operation as hereinafter-more fully described. It will be noted that the various registers of the arithmetic unit are accessible as memory as indicated by the map with memory mapped processing being provided.

It will be understood the broadcast segment 124 in FIG. 7 is substantially the same as the individual memory map 126 except that this segment addresses all the arithmetic units at the same time. A stream of matrix elements are broadcast in this manner to the advance pipe of each arithmetic unit which does a multiply-add with the data which is stored locally (in a vector register).

Writing to the control register address in the broadcast segment 124 selects the vector form in all the arithmetic units at the same time. i.e. for dot product computation, VSMA, or VMSA. Next, the broadcast segment's vector register index address is written, to set the starting vector address for all the arithmetic units. Then, after copying different matrix rows into the respective vector registers, a matrix column element is broadcast and written into the broadcast segment's advance pipe and increment index address. This sequence causes all the arithmetic units to do a multiply-add and advance to next vector register elements. Since a large number of arithmetic units may be simultaneously employed, and each stores up to eight vectors representing eight matrix rows, a matrix vector product involving all the rows of a matrix or a large portion thereof can be very rapidly performed.

The plural matrix rows are temporarily stored in each arithmetic unit so that a given broadcast column element can be multiplied against each of the rows in a pipelined manner before another column element needs to be broadcast. Therefore, the communication time requirements for the system are made less stringent and delay is avoided. The arithmetic unit utilizes two arithmetic pipelines and the incoming column element can be multiplied against the appropriate elements for the locally stored rows in sequence. Moreover, the pipelines for the multiplier and adder are respectively seven and six clock cycles long whereby partial sums are accumulated in a pipeline before being added back into the scalar registers, with eight scalar register addresses storing parts of the accumulated sums for four dot product calculations. Four multiplications of four locally stored vectors are accomplished with respect to an incoming column element, and then the next incoming column element is multiplied with the same four locally stored rows, but the answer sums are displaced in the pipeline. At the end of the calculation, the partial sums are "collapsed" into the proper sums, i.e. in the scalar registers the data from address $a_0$ is added to the data from address $a_1$, the data from address $b_0$ is added to the data from address $b_1$, the data from address $c_0$ is added to the data from address $c_1$, and the data from address $d_0$ is added to the data from address $d_1$. After collapse, the answers are placed back at the current position of the index or at the ends of the vector registers to which the sums pertain. Of course, the sums can be read by the processor 54.

If the automatic incrementation of the index is utilized as employed above, then successive locations are used in the vector registers. This is appropriate when operating on either full, banded, or profile matrices. However, if the vector register index is set before each multiply-add then indirect addressing techniques can be used for operating on random sparse matrices. In this case, the processor program reads the indices from a table of pointers in general memory and loads the index counter. The resulting loop operates at nearly the same efficiency as the full matrix case, i.e. operating on sparse matrices at substantially full speed.

Figure 8:
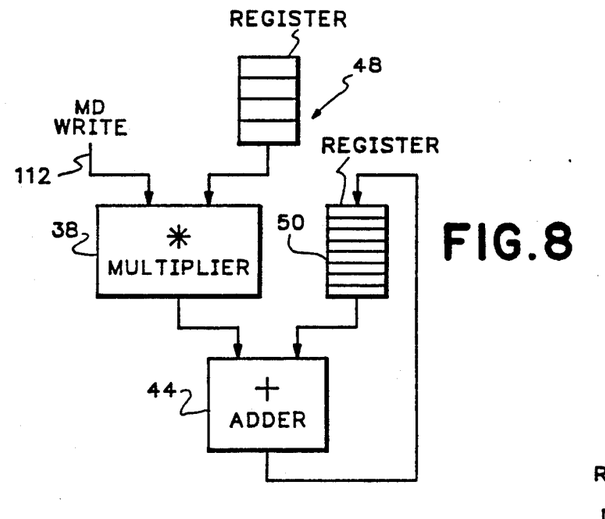
FIG. 8 is a block diagram illustrating the function of an arithmetic unit according to the present invention as interconnected for executing a dot product.
Figure 9:
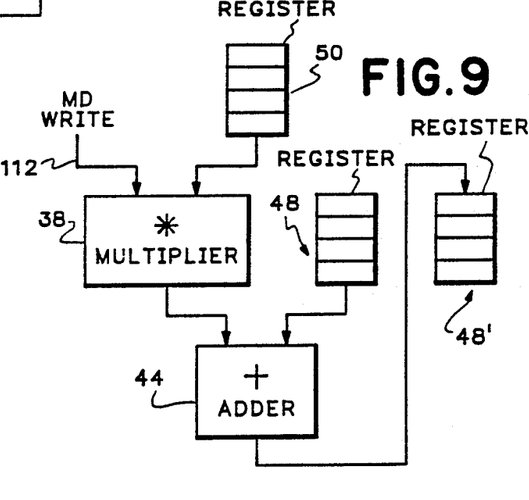
FIG. 9 is a block diagram illustrating the function of an arithmetic unit according to the present invention as interconnected for executing a VSMA calculation.
Figure 10:
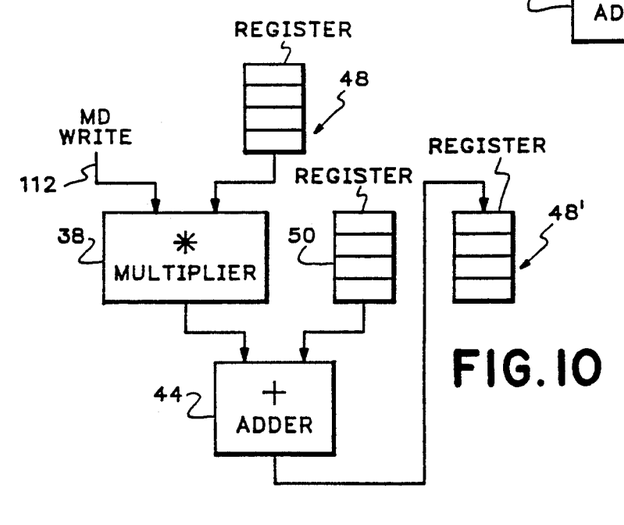
FIG. 10 is a block diagram illustrating the function of an arithmetic unit according to the present invention as interconnected for executing a VMSA calculation.

FIGS. 8, 9 and 10 illustrate the modes of operation for the dot product type of calculation, the VSMA, and VMSA respectively. The dot product configuration has been generally considered above, wherein the arithmetic unit as illustrated in FIGS. 4 and 6 essentially provides for two simultaneous dot product computations. Pursuant to the control data loaded to the particular arithmetic unit, multiplexer connections are made to configure each half of the unit to the circuit as illustrated in FIG. 8, wherein column matrix elements arrive on data pipe or advance pipe 112 and are multiplied with successive vector row elements from vector register 48. After multiplications, running sums are accumulated in scalar register 50 through the operation of adder 44 to form the dot product partial sums. As hereinbefore described, after collapse, the sums are stored back into vector register 48. It should be noted that the remaining half of each unit (the right half of FIG. 6) operates in the same manner, e.g. receiving the same input on data pipe 112, multiplying with row vectors from register 48' and storing results in register 48'.

On the other hand, for the VSMA form of calculation (as illustrated in FIG. 9), scalars from register 50 are successively multiplied with elements of the incoming column in multiplier 38 and added to local vectors from vector register 48. The vector results are stored in vector register 48'.

In the VMSA form, the control causes the appropriate multiplexer connections to be made so that column elements on advance pipe 112 are multiplied with locally stored vector elements from vector register 48 and the products are added in adder 44 to locally stored scalars. The resultants are then stored in vector register 48'. Since the versions illustrated in FIGS. 9 and 10 require vector registers from both halves of the arithmetic unit, the speed of calculation for the FIGS. 9 and 10 forms is half that of the FIG. 8 form, i.e. eleven megaflops as compared with twenty-two megaflops for the FIG. 8 circuit.

The present system is adapted to perform arithmetic calculations with respect to complex numbers. Referring again to FIG. 6, the vector registers, for example registers A and B of register 48, are adapted to store respectively the real and imaginary parts of a particular vector. Similarly, registers C and D are adapted to store real and imaginary parts of a second vector. As hereinbefore mentioned, elements of a matrix column are provided successively to data pipe 112 from memory data bus 40a which are then retained for four clock cycles on the data pipe 112 for successive multiplications. In the case of a complex input, the real part of a data column element is first received for four cycles and then the imaginary part is received for four cycles. The desired product has a real part equalling the product of the real parts of the two operands minus the product of the imaginary parts of the two operands. Also, the imaginary part of the desired product equals the sum of the products of the real part of each operand multiplied by the imaginary part of the other. It will be seen the storage configuration facilitates the utilization of a complex element received on data pipe 112 for eight clock cycles (four cycles for the real part and four cycles for the imaginary part) whereby all of the necessary products for the final resultant are sequentially produced with the vectors stored in registers A, B, C and D.

It is again understood that the reference herein to columns and rows is substantially interchangeable and, for example, a broadcast row may be presented for calculation with locally stored column vectors if so desired.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A parallel processing system comprising:
a central processor unit for directly read and write accessing addressable memory space,
an addressable memory system having data storage locations memory mapped onto addresses of said addressable memory space,
a memory bus intercoupling said memory system with said central processor unit, said data storage locations of said memory system being directly addressable by said central processor unit via said memory bus, and
a plurality of arithmetic units also intercoupled with said memory bus, each arithmetic unit comprising a plurality of addressable data storage devices mapped onto a plurality of first separate, unique addresses of said addressable memory space differing from one another and from addresses of said data storage locations of said memory system, said central processor unit directly addressing the data storage devices included in said arithmetic units through said memory bus in the manner said central processor unit addresses data storage locations in said addressable memory system for directly writing operand and control data into ones of said data storage devices and for directly reading result data from ones of said data storage devices, ones of said arithmetic units being controlled by control data stored in ones of said addressable data storage devices to perform arithmetic operations on said operand data to produce said result data, storage devices of a plurality of said arithmetic units being concurrently mapped onto second addresses of said memory system also differing from addresses of said data storage locations such that said central processor unit directly addresses said plurality of arithmetic units for simultaneously and directly writing identical data into said arithmetic units for performing arithmetic operations with respect thereto.

2. A parallel processing system according to claim 1 wherein at least one of said arithmetic units is adapted to perform computation in response to a memory write to at least one particular address on said bus.

3. A parallel processing system according to claim 1 wherein a plurality of said arithmetic units are adapted to perform computation in response to a memory write to at least one particular said second address on said bus.

4. A parallel processing system comprising:
a central processing unit,
a memory system, and
a plurality of arithmetic units, said memory system and said arithmetic units being concurrently interconnected with said central processing unit for receiving data and addresses from said central processing unit and transmitting data to said central processing unit, each arithmetic unit comprising first data storage devices, each first data storage device having a unique address and being directly addressable in the manner said central processing unit addresses data storage locations in said memory system by an address received from said central processing unit in common with said memory system, each of a plurality of said first data storage devices receiving and storing operand data from said central processing unit when addressed by a said address, at least one other of said first data storage devices transmitting result data when addressed by a said address, each arithmetic unit performing a calculation with respect to operand data received and stored in a plurality of its first data storage devices to produce said result data and storing the result data in said at least one other of said first data storage devices.

5. The system according to claim 4 wherein more than one of said arithmetic units each further comprises a second data storage device, each second data storage device being simultaneously and directly addressed by a corresponding value of address from said central processing unit and receiving and storing identical operand data from said central processing unit when addressed, said more than one of said arithmetic units performing calculations with respect to said identical operand data in conjunction with non-identical operand data retained in said first data storage devices.

6. A parallel processing system according to claim 5 wherein more than one of said arithmetic units are adapted to perform said calculations in response to a memory write to at least one particular address.

7. A parallel processing system according to claim 4 wherein at least one of said arithmetic units is adapted to perform said calculations in response to a memory write to at least one particular address.

8. A parallel processing system comprising:
a central processor unit for generating output data and addresses;
a memory system;
a plurality of arithmetic units for carrying out arithmetic operations on a plurality of operands to produce result data; and
a bus concurrently coupled to said central processor unit, to said memory system and to each of said arithmetic units for concurrently conveying an address and output data from said central processor unit to said arithmetic units and said memory system,
each arithmetic unit including a set of storage devices, each set of storage devices being memory mapped to a separate set of values of the address conveyed on said bus and each one of the set of storage devices receiving and storing the output data generated by said central processor unit and conveyed on said bus whenever the address conveyed on said bus with said output data has a value to which that one of the set of storage devices is mapped, and
each arithmetic unit carrying out a computation employing, as an operand, data stored in at least one of said storage devices for producing result data.

9. A parallel processing system according to claim 8 wherein at least one of said arithmetic units is adapted to perform said computation in response to a memory write to at least one particular address on said bus.

10. The parallel processing system in accordance with claim 8 wherein at least one of said arithmetic units includes means for storing the result data, and
wherein the at least one of said arithmetic units transmits the result data it stores as input data to said central processor unit by way of said bus when an address conveyed on said bus from said central processor unit has a particular value.

11. The parallel processing system in accordance with claim 8 wherein each said arithmetic unit includes an additional storage device, each arithmetic unit receiving and storing output data generated by said central processor unit and conveyed on said bus when an address conveyed on said bus with said output data has a particular value such that the additional storage device of each of plural arithmetic units stores corresponding output data.

12. A parallel processing system according to claim 8 wherein a plurality of said arithmetic units are adapted to perform said computation in response to a memory write to at least one particular address on said bus.

13. The parallel processing system in accordance with claim 8 wherein each said arithmetic unit includes an additional storage device, each arithmetic unit receiving and storing output data generated by said central processor unit and conveyed on said bus when an address conveyed on said bus with said output data has a particular value such that the additional storage device of each of plural arithmetic units stores corresponding output data, and
wherein ones of said plural arithmetic units employ the corresponding output data as an additional operand when carrying out said computation.

14. The parallel processing system in accordance with claim 13, wherein at least one of said arithmetic units includes means for storing the result data, and
wherein the at least one of said arithmetic units transmits the result data it stores as input data to said central processor unit by way of said bus when an address conveyed on said bus has a particular value.

* * * * *